United States Patent [19]

Bessler

[11] Patent Number: 5,471,849
[45] Date of Patent: Dec. 5, 1995

[54] INDEPENDENT COMPARTMENT TEMPERATURE CONTROL IN A HOUSEHOLD REFRIGERATOR USING FAN INTERLOCK

[75] Inventor: Warren F. Bessler, Schenectady, N.Y.

[73] Assignee: General Electric Company, Schenectady, N.Y.

[21] Appl. No.: 342,292

[22] Filed: Nov. 18, 1994

[51] Int. Cl.⁶ .................................................. F24F 7/00
[52] U.S. Cl. ............................. 62/186; 62/209; 165/22; 236/49.5
[58] Field of Search ........................ 62/186, 187, 209; 236/49.3; 165/22

[56] References Cited

U.S. PATENT DOCUMENTS

| 3,786,648 | 1/1974 | Rice | 62/200 |
|---|---|---|---|
| 4,136,732 | 1/1979 | Demaray | 165/22 X |
| 4,481,787 | 11/1984 | Lynch | 62/229 X |
| 4,682,474 | 7/1987 | Janke | 62/187 |
| 4,718,021 | 1/1988 | Timblin | 165/22 X |
| 4,732,010 | 3/1988 | Linstromberg et al. | 62/187 |
| 4,966,010 | 10/1990 | Jaster et al. | 62/179 |
| 5,018,364 | 5/1991 | Chesnut et al. | 62/187 |
| 5,255,530 | 10/1993 | Janke | 62/180 |
| 5,344,069 | 9/1994 | Narikiyo | 62/186 X |

Primary Examiner—William E. Tapolcai
Attorney, Agent, or Firm—Paul R. Webb, II

[57] ABSTRACT

Energy efficient independent temperature control is achieved in refrigerators by minimizing evaporator fan on time. A circuit including a first switch responsive to a freezer thermostat and a second switch responsive to a fresh food thermostat controls operation of the refrigeration system and the evaporator fan. The first and second switches are connected so that the refrigeration system and the evaporator fan can be activated only when the freezer thermostat demands cooling. A fan interlock having one or more relays prevents the first switch from inactivating the evaporator fan if the fresh food thermostat demands cooling. Thus, the evaporator fan only runs while the refrigeration system is operating or has immediately shut off.

14 Claims, 6 Drawing Sheets

INDEPENDENT COMPARTMENT TEMPERATURE CONTROL IN A HOUSEHOLD REFRIGERATOR USING FAN INTERLOCK

BACKGROUND OF THE INVENTION

This invention relates generally to refrigerator controls and more particularly to an improved circuit for efficiently controlling the temperatures in the refrigerator compartments.

Household refrigerators typically comprise a freezer compartment and a fresh food compartment separated by a partition. The freezer compartment is cooled by a fan circulating air over an evaporator situated in the freezer compartment. The fresh food compartment is cooled by diverting chilled air from the freezer compartment to the fresh food compartment through an air passage in the partition wall. The temperatures in the compartments gradually rise due to heat transfer through the walls and doors of the refrigerator as well as from door openings and the loading of food items therein. Various methods for controlling the temperatures of the freezer and fresh food compartments are known, but these known methods typically cause the evaporator fan to be operated whenever either compartment requires cooling. This results in frequent operation of the evaporator fan with a corresponding expenditure of energy.

Accordingly, there is a need for an arrangement for obtaining adequate temperature stability within both food compartments of a refrigerator with minimum energy consumption.

SUMMARY OF THE INVENTION

The above-mentioned needs are met by the present invention which achieves energy efficient independent temperature control by reducing on time of the evaporator fan. This is accomplished with a control comprising a first thermostat having a temperature sensing element located in the freezer compartment and a second thermostat having a temperature sensing element located in the fresh food compartment. The thermostats are arranged so that only the freezer thermostat is able to activate the evaporator fan (thereby preventing extraneous operation of the evaporator fan to satisfy the fresh food load), while either of the thermostats can inactivate the evaporator fan.

More specifically, the present invention can comprise a control circuit which includes a first switch responsive to the freezer thermostat and a second switch responsive to the fresh food thermostat. The first and second switches are connected so that the refrigeration system and the evaporator fan are activated when the freezer thermostat demands cooling. A fan interlock comprising one or more relays prevents the first switch from inactivating the evaporator fan if the fresh food thermostat demands cooling. Under this arrangement, the evaporator fan only runs while the refrigeration system is operating or has immediately shut off. In addition to preventing extraneous operation of the evaporator fan, this permits additional cooling capacity to be extracted from the evaporator immediately following system shut off if fresh food cooling demand warrants it, thereby reducing cycling losses and improving system efficiency. Additional advantages of the present invention include accommodating fresh food door opening transients without compressor operation and reducing ice cube fusing.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
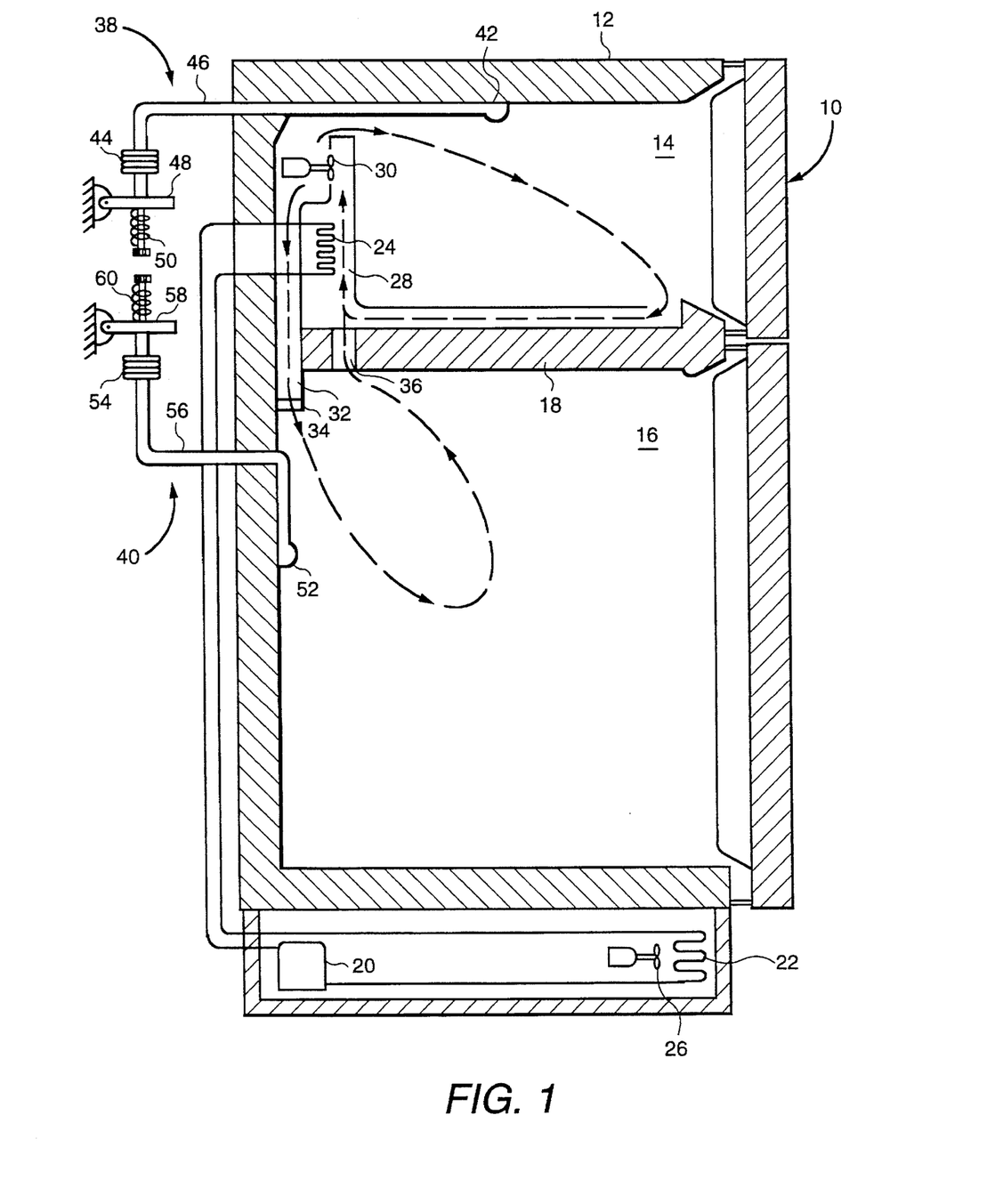
FIG. 1 is a schematic diagram showing a cross-sectional side view of a refrigerator in accordance with the present invention.

Referring to the drawings wherein identical reference numerals denote the same elements throughout the various views, FIG. 1 shows a refrigeration apparatus such as a household refrigerator 10 including the control system of the present invention. Although the refrigerator 10 shown in FIG. 1 is a top mount refrigerator, it should be noted that the present invention is equally applicable to other types of refrigerators, such as the well known side-by-side design.

The refrigerator 10 comprises an outer cabinet 12 having a freezer compartment 14 and a fresh food compartment 16 separated by a partition wall 18. The two compartments are maintained at the desired temperature levels by a refrigeration system which comprises a compressor 20, a condenser 22 and an evaporator 24 connected in fluid communication and charged with a refrigerant. An expansion device (not shown) is connected between the condenser 22 and the evaporator 24 as is well known in the art. A condenser fan 26 is situated adjacent to the condenser 22 and causes air to flow over the condenser 22 to promote heat transfer.

The evaporator 24 is located within a chamber 28 situated in the rear of the freezer compartment 14. An evaporator fan 30 is positioned above the evaporator 24. The evaporator fan 30 draws air from the freezer compartment 14 into the chamber 28 and over the evaporator 24 and discharges cooled air into the freezer compartment 14. Some of the air cooled by the evaporator 24 is diverted through an air passage 32 into the fresh food compartment 16. A damper 34 is provided in the air passage 32 to regulate the flow of air into the fresh food compartment 16. The division of cooling air is such that the freezer compartment 14 is maintained at below freezing temperatures and the fresh food compartment 16 is maintained at food preserving temperatures. Air is returned to the chamber 28 from the fresh food compartment 16 via a return duct 36 in the partition wall 18.

The refrigerator 10 includes a freezer thermostat 38 and a fresh food thermostat 40. By way of example, the thermostats 38,40 are shown as the expansible gas type although other types could be used. The freezer thermostat 38 has a temperature sensing element 42 located in the freezer compartment 14. The temperature sensing element 42 is typically a bulb containing a volatile fluid which is connected to an expansible bellows 44 by a capillary tube 46. The bellows 44 will thus expand and contract as the temperature in the freezer compartment 14 increases and decreases. An actuating arm 48 is arranged to move between first and second positions in response to expansion and contraction of the bellows 44. The actuating arm 48 assumes the first position as long as the temperature in the freezer compartment 14 is below a predetermined level and moves with snap action into the second position when the temperature in the freezer compartment 14 exceeds the predetermined level. The temperature at which the actuating arm 48 switches position (referred to herein as the "preset temperature level") may be varied by means of an adjustable spring 50.

The fresh food thermostat 40 is similar to the freezer thermostat 38 and includes a temperature sensing element 52 located in the fresh food compartment 16 which is connected to a bellows 54 by a capillary tube 56. An actuating arm 58 is controlled by the bellows 54 in response to temperature changes in the fresh food compartment 16. The preset temperature level at which the actuating arm 58 switches between its first and second positions may be varied by means of an adjustable spring 60. The fresh food thermostat 40 also controls the opening and closing of the damper 34, where the damper 34 is closed when the actuating arm 58 is in its first position, and the damper 34 is opened when the actuating arm 58 is in its second position. The actuating arm 58 can either be mechanically linked to the damper 34 to directly manipulate the damper 34, or the actuating arm 58 can activate a motor arranged to open and close the damper 34. Although schematically shown outside of the refrigerator for ease of illustration, the thermostats 38,40 are normally contained within the refrigerator cabinet 12 with control knobs for adjusting the springs 50,60 being accessible through the fresh food compartment 16.

Figure 2:
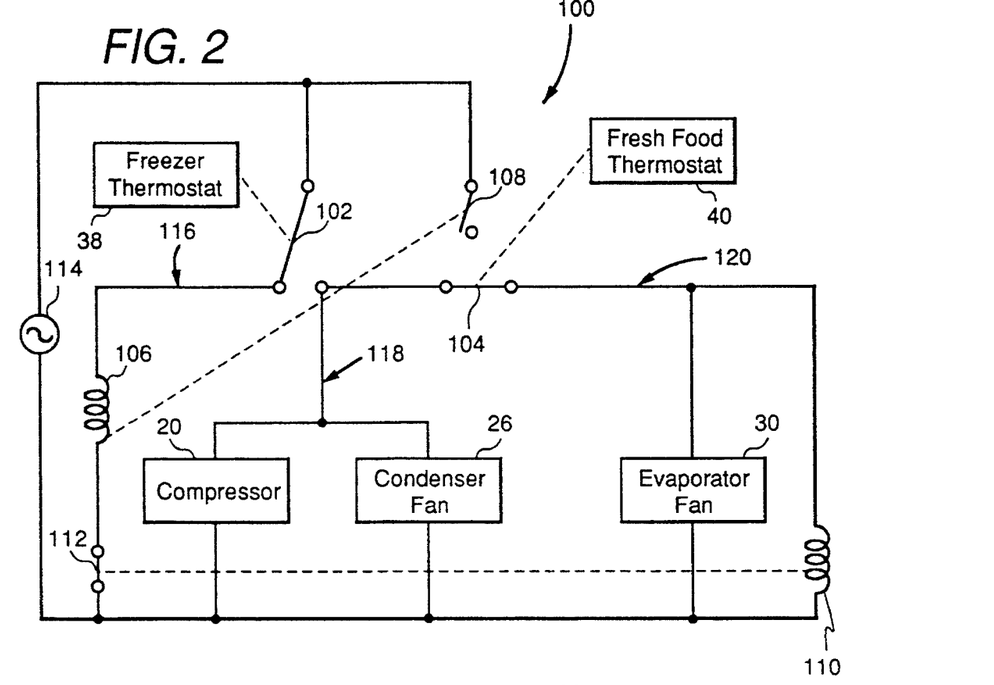
FIGS. 2 and 3 are schematic diagrams of a first embodiment of the control circuit in accordance with the present invention.
Figure 3:
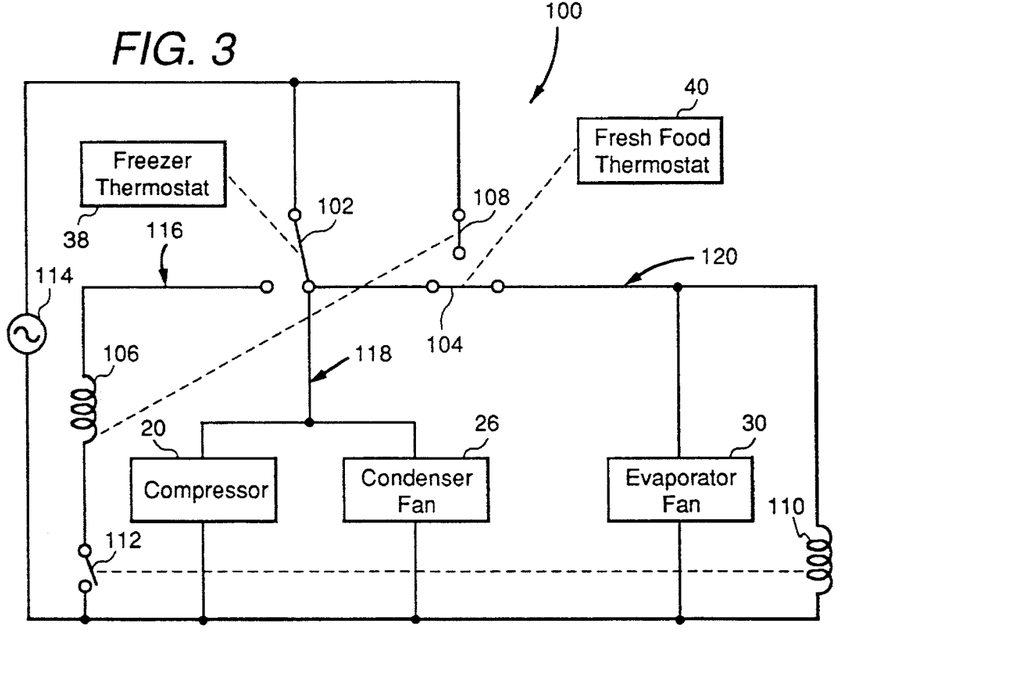

Turning now to FIGS. 2 and 3, a control circuit 100, which is a first embodiment of the refrigerator control of the present invention, is shown. The control circuit 100 includes a first thermostat switch 102, a second thermostat switch 104, a first relay coil 106, a first relay switch 108, a second relay coil 110 and a second relay switch 112. The first thermostat switch 102 is a single pole, double throw switch connected to a source of power 114. The first thermostat switch 102 is switched between first and second states in response to the freezer thermostat 38. Specifically, when the freezer thermostat 38 is satisfied (i.e., the temperature in the freezer compartment 14 is below the preset temperature level), the first thermostat switch 102 assumes its first state, and when the freezer thermostat 38 demands cooling (i.e., the temperature in the freezer compartment 14 exceeds the preset temperature level), the first thermostat switch 102 assumes its second state. The first thermostat switch 102 connects a first branch 116 of the circuit 100 to the source of power 114 when in its first state and connects a second branch 118 of the circuit 100 to the source of power 114 when in its second state. The first circuit branch 116 comprises the first relay coil 106 and the second relay switch 112 connected in series, and the second circuit branch 118 comprises the compressor 20 and the condenser fan 26 connected in parallel.

The second thermostat switch 104 is a single pole, double throw switch which is responsive to the fresh food thermostat 40. When the temperature in the fresh food compartment 16 is below the preset temperature level (the fresh food thermostat 40 is satisfied), the second thermostat switch 104 assumes a first state and connects a third circuit branch 120, which comprises the evaporator fan 30 and the second relay coil 110 connected in parallel, to the first thermostat switch 102. When the temperature in the fresh food compartment 16 exceeds the preset temperature level (the fresh food thermostat 40 demands cooling), the second thermostat switch 104 assumes a second state and connects the third circuit branch 120 to the first relay switch 108.

The first relay coil 106 is operatively connected to the first relay switch 108 so that the first relay switch 108 will open when the first relay coil 106 is energized, and the second relay coil 110 is operatively connected to the second relay switch 112 so that the second relay switch 112 will open when the second relay coil 110 is energized. These relays can be either the mechanical or solid state type.

FIG. 2 shows the control circuit 100 when the freezer and fresh food thermostats 38,40 are both satisfied. The first thermostat switch 102 is in its first state so that the first branch 116 is connected to the source of power 114, and the second thermostat switch 104 is in its first state so that the second branch 118 is connected to the first thermostat switch 102 but not connected to the source of power 116. Accordingly, the second relay coil 110 is not energized and the second relay switch 112 will remain closed. The first relay coil 106 will thus be energized, thereby opening the first relay switch 108. The compressor 20, condenser fan 26 and evaporator fan 30 will all be inactive.

As long as the freezer thermostat 38 remains satisfied, the third branch 120 will not be connected to the source of power 114 regardless of the state of the second thermostat switch 104. That is, even if the second thermostat switch 104 switches to its second state connecting the third branch 120 to the first relay switch 108 in response to demand from the fresh food thermostat 40, the third branch 120 will remain unconnected to the source of power 114 because the first relay switch 108 is open. Thus, the evaporator fan 30 as well as the compressor 20 and the condenser fan 26 are activated only in response to the freezer thermostat 38 through the first thermostat switch 102.

When the freezer thermostat 38 demands cooling, the first thermostat switch 102 will switch to its second state as shown in FIG. 3. The second branch 118 is now connected to the source of power 114 and the compressor 20 and condenser fan 26 will both be activated. Furthermore, the first relay coil 106 will no longer be energized, causing the first relay switch 108 to close. Thus, the evaporator fan 30 will be activated no matter what state the second thermostat switch 104 is in because the third branch 120 will be connected to the source of power 114, either via the first thermostat switch 102 when the second thermostat switch 104 is in its first state (as shown in FIG. 3) or via the first relay switch 108 when the second thermostat switch 104 is in its second state.

The second relay coil 110 will also be energized regardless of the state of the second thermostat switch 104. Accordingly, the second relay switch 112 will open. This means that if the first thermostat switch 102 switches from its second to first state while the second thermostat switch 104 is in its second state, the first relay coil 106 will not be energized and the first relay switch 108 will remain closed. The evaporator fan 30 will thus continue to run until the fresh food thermostat 40 is satisfied and the second thermostat switch 104 returns to its first state.

Thus, while only the freezer thermostat 38 can activate the evaporator fan 30 (thereby preventing extraneous operation of the evaporator fan 30 to satisfy the fresh food load), either the freezer thermostat 38 or the fresh food thermostat 40 can inactivate the evaporator fan 30. Under this arrangement, the evaporator fan 30 only runs while the refrigeration system is operating or has immediately shut off. This permits additional cooling capacity to be extracted from the evaporator 24 immediately following system shut off if fresh food cooling demand warrants it, thereby reducing cycling losses and improving system efficiency. And since air from the fresh food compartment 16 only flows through the return duct 36 while the evaporator fan 30 is running, fresh food return air flows into the freezer compartment 14 only while the refrigeration system is operating or has immediately shut off. This reduces ice cube fusing. Furthermore, the present invention is able to accommodate fresh food door opening transients without compressor operation because the damper 34 is operated by the fresh food thermostat 40 independently of the refrigeration system.

Figure 4:
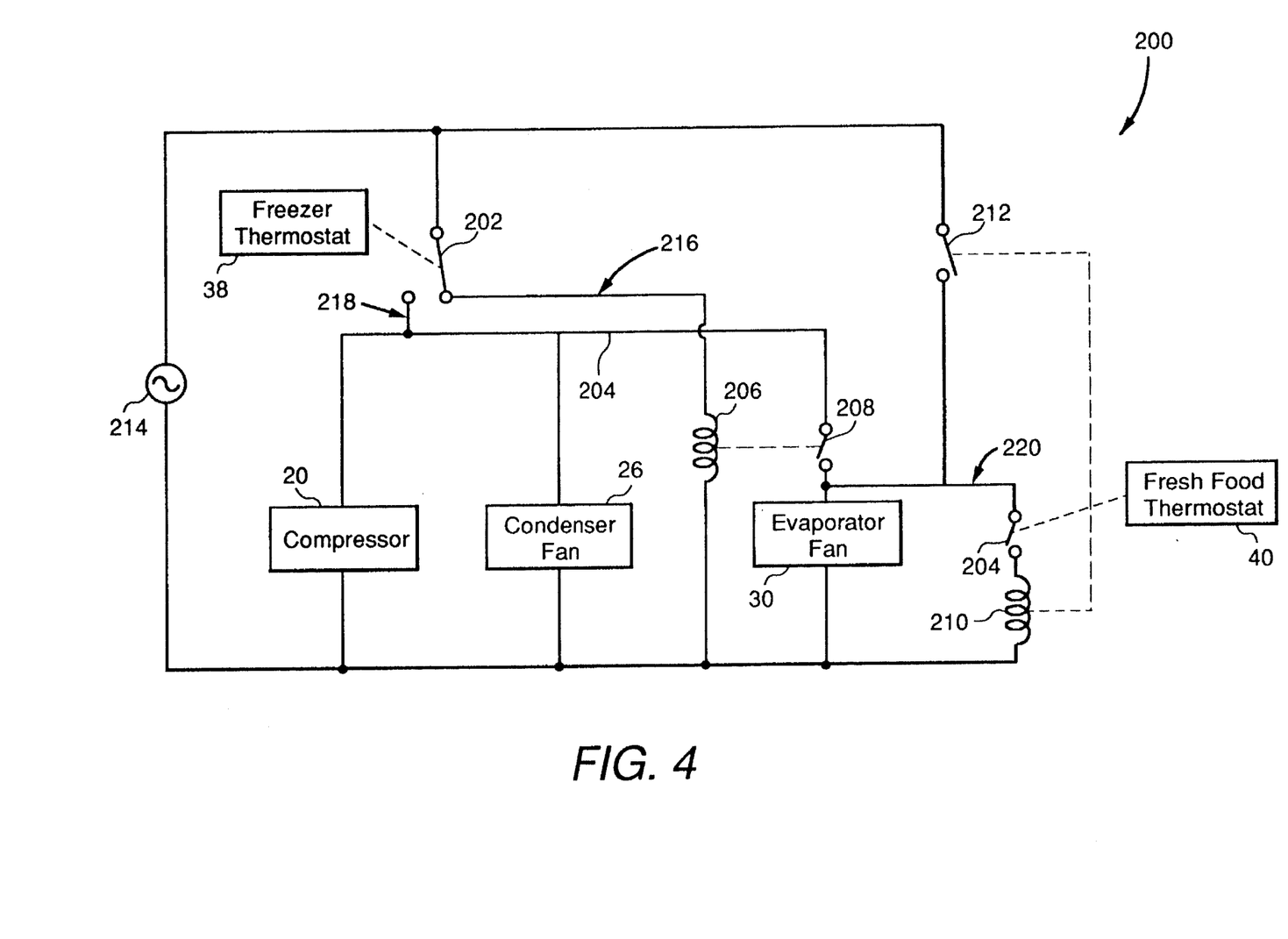
FIGS. 4 and 5 are schematic diagrams of a second embodiment of the control circuit in accordance with the present invention.
Figure 5:
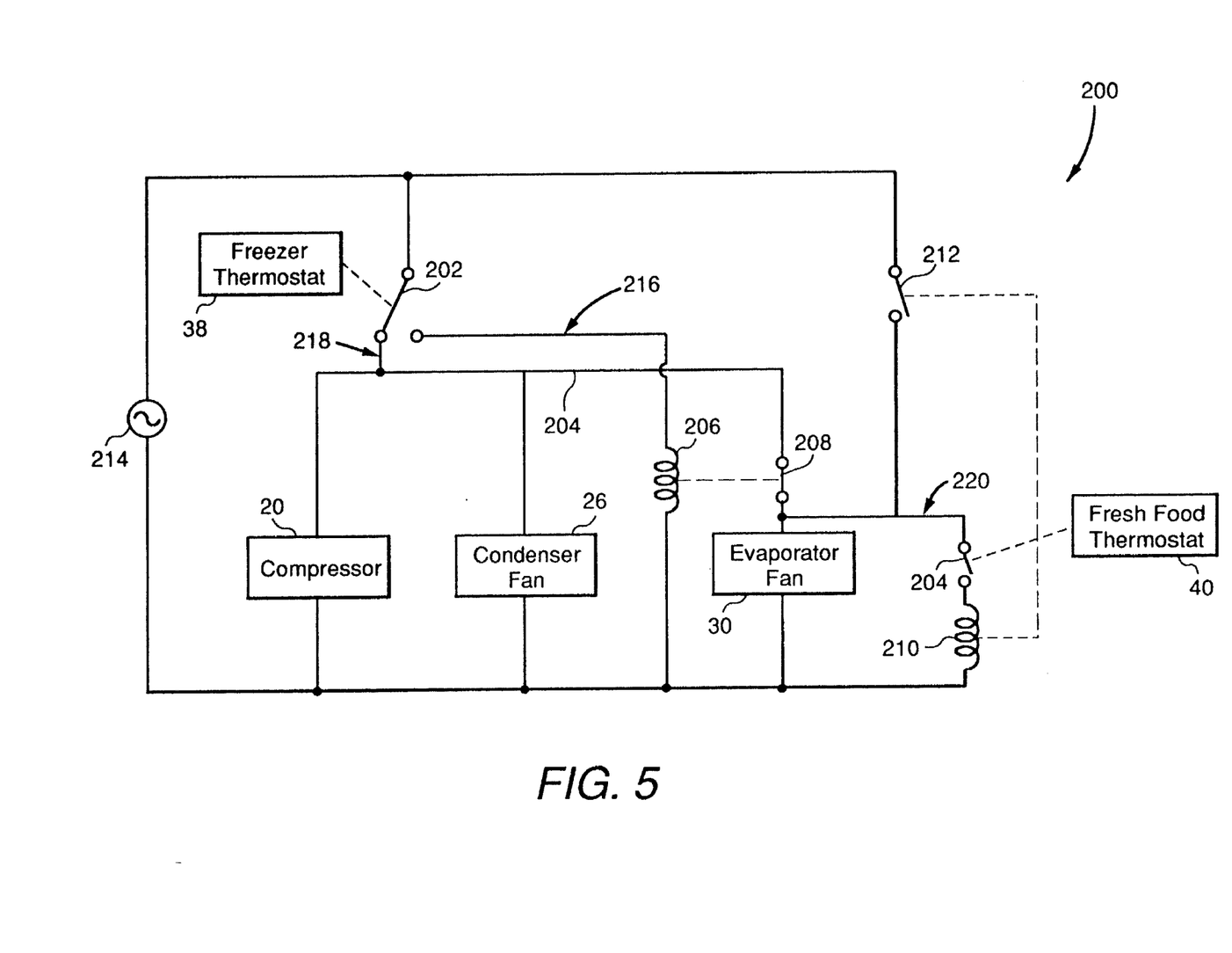

FIGS. 4 and 5 show a control circuit 200, which is a second embodiment of the present invention. The control circuit 200 includes a first thermostat switch 202, a second thermostat switch 204, a first relay coil 206, a first relay switch 208, a second relay coil 210 and a second relay switch 212. The first thermostat switch 202 is a single pole, double throw switch connected to a source of power 214. The first thermostat switch 202 is switched between first and second states in response to the freezer thermostat 38. Specifically, when the freezer thermostat 38 is satisfied, the first thermostat switch 202 assumes its first state, and when the freezer thermostat 38 demands cooling, the first thermostat switch 202 assumes its second state. The first thermostat switch 202 connects a first branch 216 of the circuit 200 to the source of power 214 when in its first state and connects a second circuit branch 218 to the source of power 214 when in its second state. The first circuit branch 216 comprises the first relay coil 206, and the second circuit branch 218 comprises the compressor 20, the condenser fan 26 and the evaporator fan 30 all connected in parallel. The second branch 218 also includes the first relay switch 208 connected in series with the evaporator fan 30.

A third circuit branch 220 comprises the second thermostat switch 204 and the second relay coil 210 connected in series with one side of the second thermostat switch 204 being connected to the second branch 218 between the first relay switch 208 and the evaporator fan 30. The second thermostat switch 204 is also connected to the source of power 214 via the second relay switch 212. The second thermostat switch 204 is responsive to the fresh food thermostat 40 so as to be open when the fresh food thermostat 40 is satisfied and to be closed when the fresh food thermostat 40 demands cooling.

The first relay coil 206 is operatively connected to the first relay switch 208 so that the first relay switch 208 will open when the first relay coil 206 is energized, and the second relay coil 210 is operatively connected to the second relay switch 212 so that the second relay switch 212 will close when the second relay coil 210 is energized.

FIG. 4 shows the control circuit 200 when the freezer and fresh food thermostats 38,40 are both satisfied. The first thermostat switch 202 is in its first state so that the first branch 216 is connected to the source of power 214, and the second thermostat switch 204 is open. Accordingly, the first relay coil 206 is energized and the first relay switch 208 will be open. The second relay coil 210 will not be energized, thereby opening the second relay switch 212. The compressor 20, condenser fan 26 and evaporator fan 30 will all be inactive.

With the first thermostat switch 202 in its first state (the freezer thermostat 38 is satisfied), the compressor 20, condenser fan 26 and evaporator fan 30 will remain inactive regardless of the state of the second thermostat switch 204. That is, even if the second thermostat switch 204 closes in response to demand from the fresh food thermostat 40, there will be no other changes in the circuit 200 because both the first relay switch 208 and the second relay switch 212 will remain open. Thus, the evaporator fan 30 as well as the compressor 20 and the condenser fan 26 are activated only in response to the freezer thermostat 38 through the first thermostat switch 202.

When the freezer thermostat 38 demands cooling, the first thermostat switch 202 will switch to its second state as shown in FIG. 5. The second branch 218 is now connected to the source of power 214 and the compressor 20 and condenser fan 26 will both be activated. Furthermore, the first relay coil 206 will no longer be energized, causing the first relay switch 208 to close so that the evaporator fan 30 will also be activated.

If the second thermostat switch 204 is closed in response to demand from the fresh food thermostat 40 while the first thermostat switch 202 is in its second state, the second relay coil 210 will now be energized because the first relay switch 208 will be closed. This means that the second relay switch 212 will close and connect both the third branch 210 and the evaporator fan 30 to the source of power 214. Thus, if the first thermostat switch 202 switches back to first state (causing the first relay switch 208 to open) while the second thermostat switch 204 is closed, the evaporator fan 30 will continue to run, but the compressor 20 and condenser fan 26 will be inactivated. The evaporator fan 30 will thus continue to run until the fresh food thermostat 40 is satisfied and the second thermostat switch 204 opens again. Thus, as with the first embodiment, only the freezer thermostat 38 can activate the evaporator fan 30, but either the freezer thermostat 38 or the fresh food thermostat 40 can inactivate the evaporator fan 30.

Figure 6:
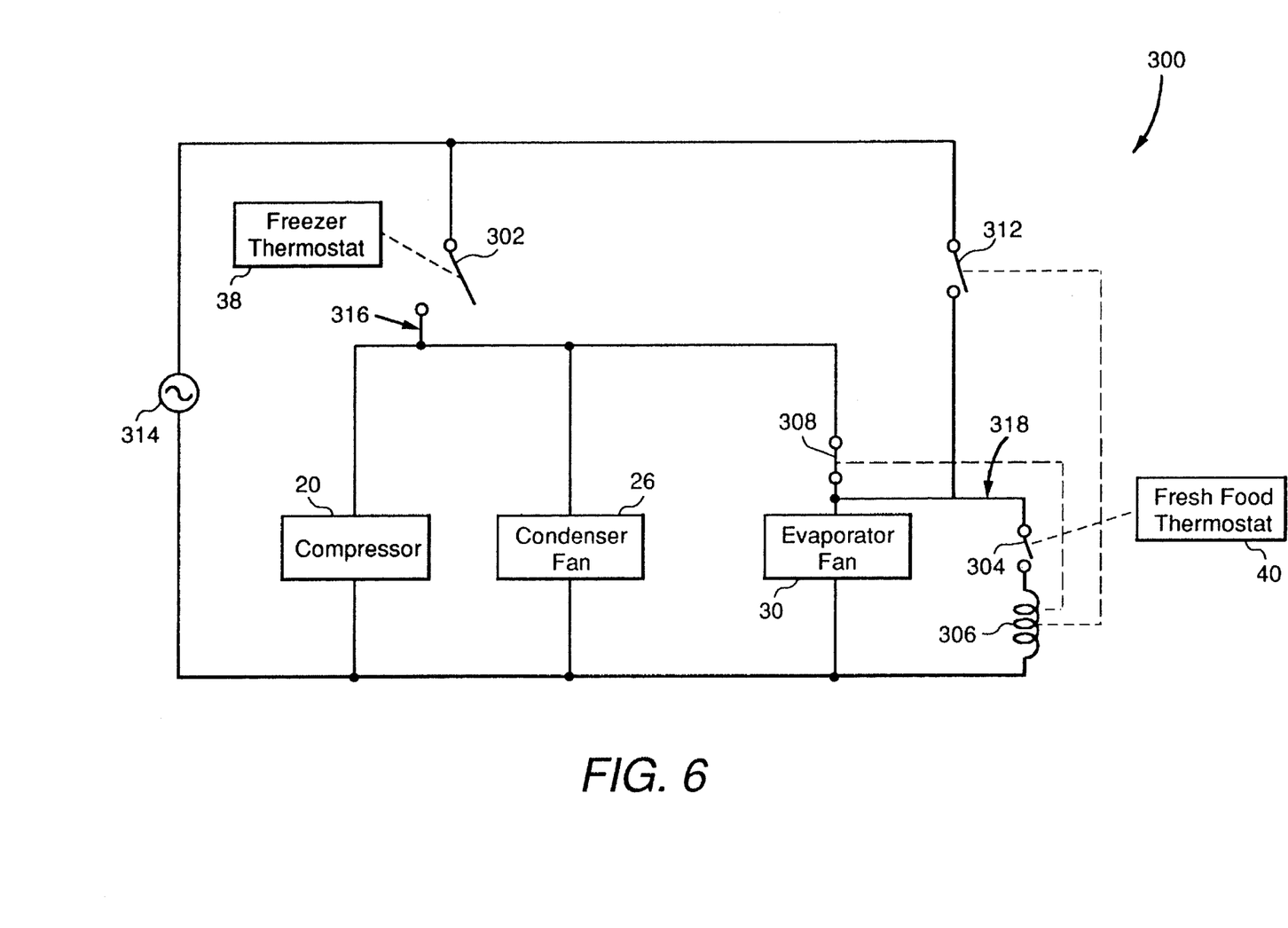
FIGS. 6 and 7 are schematic diagrams of a third embodiment of the control circuit in accordance with the present invention.
Figure 7:
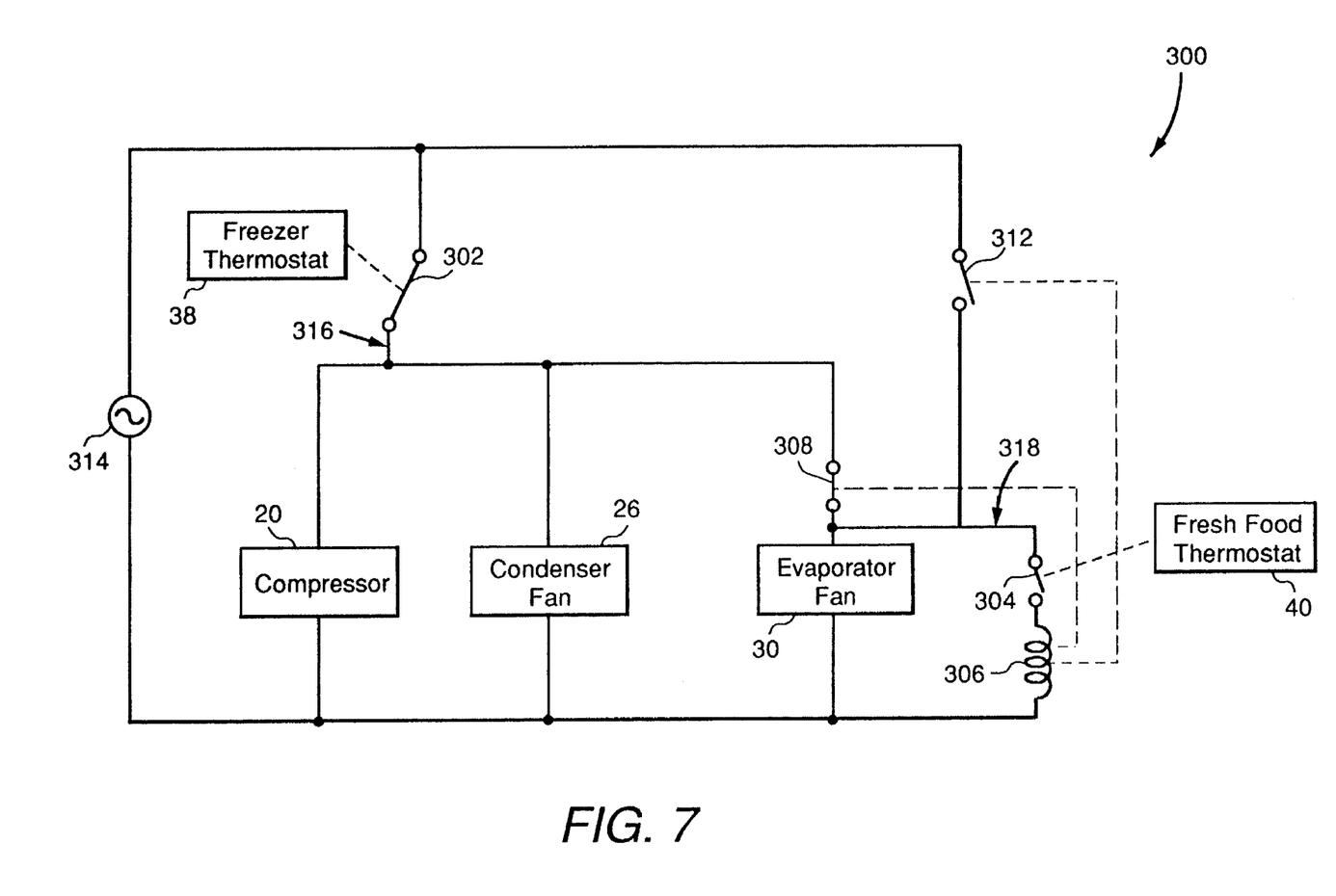

FIGS. 6 and 7 show a control circuit 300, which is a third embodiment of the present invention. The control circuit 300 includes a first thermostat switch 302, a second thermostat switch 304, a relay coil 306, a first relay switch 308 and a second relay switch 312. The first thermostat switch 302 is connected between a source of power 314 and a first circuit branch 316 comprising the compressor 20, the condenser fan 26 and the evaporator fan 30 all connected in parallel. The first branch 316 also includes the first relay switch 308 connected in series with the evaporator fan 30. The first thermostat switch 302 is responsive to the fresh food thermostat 40 so as to be open when the fresh food thermostat 40 is satisfied and to be closed when the fresh food thermostat 40 demands cooling.

A third circuit branch 318 comprises the second thermostat switch 304 and the relay coil 306 connected in series with one side of the second thermostat switch 304 being connected to the first branch 316 between the first relay switch 308 and the evaporator fan 30. The second thermostat switch 304 is also connected to the source of power 314 via the second relay switch 312. The second thermostat switch 304 is responsive to the fresh food thermostat 40 so as to be open when the fresh food thermostat 40 is satisfied and to be closed when the fresh food thermostat 40 demands cooling.

The relay coil 306 is operatively connected to both the first relay switch 308 second relay switch 312 to form an overlapping relay that allows one contact set to make before the other contact set breaks. The relay is such that the first relay switch 308 will open and the second relay switch 312 will close when the relay coil 306 is energized. The relay switches 308,312 will reverse when the relay coil 306 is not energized.

FIG. 6 shows the control circuit 300 when the freezer and fresh food thermostats 38,40 are both satisfied. With these conditions, both the first thermostat switch 302 and the second thermostat switch 304 are open. Accordingly, the relay coil 306 is not energized so the first relay switch 308 will be closed and the second relay switch 312 will be open. The compressor 20, condenser fan 26 and evaporator fan 30 will all be inactive.

With the first thermostat switch 302 open (the freezer thermostat 38 is satisfied), the compressor 20, condenser fan 26 and evaporator fan 30 will remain inactive regardless of the state of the second thermostat switch 204. That is, even if the second thermostat switch 204 closes in response to demand from the fresh food thermostat 40, there will be no other changes in the circuit 300 because both the first thermostat switch 302 and the second relay switch 312 will remain open. Thus, the evaporator fan 30 as well as the compressor 20 and the condenser fan 26 are activated only in response to the freezer thermostat 38 through the first thermostat switch 302.

When the freezer thermostat 38 demands cooling, the first thermostat switch 302 will close as shown in FIG. 7. The first branch 316 is now connected to the source of power 314 and the compressor 20 and condenser fan 26 will both be activated. Furthermore, the evaporator fan 30 will also be activated because the first relay switch 308 is closed.

If the second thermostat switch 304 is closed in response to demand from the fresh food thermostat 40 while the first thermostat switch 302 is closed, the relay coil 306 will be energized because the first relay switch 308 is closed. This means that the second relay switch 312 will close and then the first relay switch 308 will open. The evaporator fan 30 will thus remain connected to the source of power 314 via the second relay switch 312. Thus, if the first thermostat switch 302 opens while the second thermostat switch 304 is closed, the evaporator fan 30 will continue to run, but the compressor 20 and condenser fan 26 will be inactivated. The evaporator fan 30 will thus continue to run until the fresh food thermostat 40 is satisfied and the second thermostat switch 304 opens again. As with the prior embodiments, only the freezer thermostat 38 can activate the evaporator fan 30, but either the freezer thermostat 38 or the fresh food thermostat 40 can inactivate the evaporator fan 30.

The foregoing has described independently controlling the temperatures in the freezer and fresh food compartments of a refrigerator in an energy efficient manner. While specific embodiments of the present invention have been described, it will be apparent to those skilled in the art that various modifications thereto can be made without departing from the spirit and scope of the invention as defined in the appended claims.

What is claimed is:

1. A control for a refrigeration apparatus having first and second cooled compartments, a compressor and an evaporator fan, said control comprising:

a first thermostat having a temperature sensing element located in said first compartment; and a second thermostat having a temperature sensing element located in said second compartment, wherein only said first thermostat is arranged to activate said evaporator fan and both of said first and second thermostats are arranged to inactivate said evaporator fan.

2. A control for a refrigeration apparatus having first and second cooled compartments, a compressor and an evaporator fan, said control comprising:

a first thermostat having a temperature sensing element located in said first compartment;

a second thermostat having a temperature sensing element located in said second compartment;

a first switch responsive to said first thermostat; and a second switch responsive to said second thermostat, wherein only said first switch is arranged to activate said evaporator fan and both of said first and second switches are arranged to inactivate said evaporator fan.

3. The control of claim 2 further comprising:

a first relay coil connected to said first switch, said first switch also being connected to said compressor;

a second relay coil connected to said second switch, said second switch also being connected to said evaporator fan;

a third switch connected to said second switch, said third switch being opened upon energization of said first relay coil; and a fourth switch connected to said first relay coil, said fourth switch being opened upon energization of said second relay coil.

4. The control of claim 3 wherein said first switch is selectively operated by said first thermostat between a first state in which said first relay coil is connected to a source of power and a second state in which said compressor and said second switch are connected to the source of power, and said second switch is selectively operated by said second thermostat between a first state in which said first switch is connected to said evaporator fan and to said second relay coil and a second state in which said third switch is connected to said evaporator fan and to said second relay coil.

5. The control of claim 4 wherein said third switch is connected to the source of power.

6. The control of claim 2 further comprising:

a first relay coil connected to said first switch, said first switch also being connected to said compressor;

a second relay coil connected to said second switch;

a third switch connected between said first switch and said evaporator fan and to said second switch, said third switch being opened upon energization of said first relay coil; and a fourth switch connected to said second switch and to said evaporator fan, said fourth switch being closed upon energization of said second relay coil.

7. The control of claim 6 wherein said first switch is selectively operated by said first thermostat between a first state in which said first relay coil is connected to a source of power and a second state in which said compressor and said third switch are connected to the source of power.

8. The control of claim 7 wherein said fourth switch is connected to the source of power.

9. The control of claim 2 further comprising:

a relay coil connected to said second switch;

a third switch connected between said first switch and said evaporator fan and to said second switch, said first switch also being connected to said compressor; and a fourth switch connected to said second switch and to said evaporator fan, said third switch being opened upon energization of said relay coil and said fourth switch being closed upon energization of said relay coil.

10. The control of claim 9 wherein said fourth switch is connected to the source of power.

11. A refrigeration apparatus comprising:

a freezer compartment;

a fresh food compartment;

an air passage between said freezer compartment and said fresh food compartment;

a damper situated in said air passage;

a compressor;

an evaporator fan situated in said freezer compartment for circulating air within said freezer compartment and through said air passage;

a first thermostat having a temperature sensing element situated in said freezer compartment;

a second thermostat having a temperature sensing element situated in said fresh food compartment, said second thermostat controlling opening and closing of said damper; and a control circuit connected to said first and second thermostats so that only said first thermostat activates said compressor and said evaporator fan and both said first and second thermostats inactivate said compressor and said evaporator fan.

12. The refrigeration apparatus of claim 11 wherein said control circuit comprises:

a first switch responsive to said first thermostat and connected to said compressor;

a second switch responsive to said second thermostat and connected to said evaporator fan;

a first relay coil connected to said first switch;

a second relay coil connected to said second switch;

a third switch connected between a source of power and said second switch, said third switch being opened upon energization of said first relay coil; and a fourth switch connected to said first relay coil, said fourth switch being opened upon energization of said second relay coil, said first switch being selectively operated by said first thermostat between a first state in which said first relay coil is connected to the source of power and a second state in which said compressor and said second switch are connected to the source of power, said second switch being selectively operated by said second thermostat between a first state in which said first switch is connected to said evaporator fan and to said second relay coil and a second state in which said third switch is connected to said evaporator fan and to said second relay coil.

13. The refrigeration apparatus of claim 11 wherein said control circuit comprises:

a first switch responsive to said first thermostat and connected to said compressor;

a second switch responsive to said second thermostat;

a first relay coil connected to said first switch;

a second relay coil connected to said second switch;

a third switch connected between said first switch and said evaporator fan and to said second switch, said third switch being opened upon energization of said first relay coil; and a fourth switch connected between a source of power and said second switch and said evaporator fan, said fourth switch being closed upon energization of said second relay coil, said first switch being selectively operated by said first thermostat between a first state in which said first relay coil is connected to the source of power and a second state in which said compressor and said third switch are connected to the source of power.

14. The refrigeration apparatus of claim 11 wherein said control circuit comprises:

a first switch responsive to said first thermostat and connected to said compressor;

a second switch responsive to said second thermostat;

a relay coil connected to said second switch;

a third switch connected between said first switch and said evaporator fan and to said second switch; and a fourth switch connected between a source of power and said second switch and said evaporator fan, said third switch being opened upon energization of said relay coil and said fourth switch being closed upon energization of said relay coil.

* * * * *